United States Patent
Crusius et al.

(10) Patent No.: US 7,786,619 B2
(45) Date of Patent: Aug. 31, 2010

(54) DC POWER BACKUP

(75) Inventors: Steven Carl Crusius, Buffalo Grove, IL (US); James J. Fitzgibbon, Batavia, IL (US); Robert Keller, Chicago, IL (US); Matthew Stephen, Glen Ellen, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 335 days.

(21) Appl. No.: 10/661,177

(22) Filed: Sep. 12, 2003

(65) Prior Publication Data

US 2005/0057100 A1    Mar. 17, 2005

(51) Int. Cl.
*H02J 9/00* (2006.01)
(52) U.S. Cl. .......................... 307/66; 307/64
(58) Field of Classification Search ............... 307/66, 307/64; 379/67.1
See application file for complete search history.

(56) References Cited

U.S. PATENT DOCUMENTS

| | | | | |
|---|---|---|---|---|
| 4,401,895 A | * | 8/1983 | Petkovsek | 307/66 |
| 4,672,293 A | * | 6/1987 | Crampton | 320/128 |
| 4,675,538 A | | 6/1987 | Epstein | |
| 5,182,518 A | * | 1/1993 | Stich et al. | 324/511 |
| 5,200,644 A | * | 4/1993 | Kobayashi et al. | 307/66 |
| 5,206,538 A | * | 4/1993 | Orta | 307/66 |
| 5,391,927 A | * | 2/1995 | Kaziwara | 307/66 |
| 5,528,149 A | * | 6/1996 | Chen | 324/433 |
| 5,619,076 A | * | 4/1997 | Layden et al. | 307/48 |
| 5,703,471 A | * | 12/1997 | Bullock et al. | 320/134 |
| 5,726,573 A | * | 3/1998 | Chen et al. | 324/429 |
| 5,796,182 A | * | 8/1998 | Martin | 307/66 |
| 5,834,858 A | * | 11/1998 | Crosman et al. | 307/66 |
| 5,844,327 A | | 12/1998 | Batson | |
| 5,844,328 A | * | 12/1998 | Furst | 307/66 |
| 5,898,234 A | * | 4/1999 | Kitagawa | 307/48 |
| 5,909,360 A | * | 6/1999 | Lavin et al. | 307/66 |
| 5,990,577 A | * | 11/1999 | Kamioka et al. | 307/26 |
| 6,075,345 A | * | 6/2000 | Lee | 320/138 |
| 6,204,573 B1 | * | 3/2001 | Green et al. | 307/66 |
| 6,225,708 B1 | | 5/2001 | Furukawa et al. | |

(Continued)

FOREIGN PATENT DOCUMENTS

EP    0 696 832 A2    2/1996

(Continued)

OTHER PUBLICATIONS

Search Report Under Section 17 from British Application No. GB0420187.7 Dated Feb. 1, 2005.

(Continued)

*Primary Examiner*—Stephen W Jackson
*Assistant Examiner*—Adi Amrany
(74) *Attorney, Agent, or Firm*—Fitch Even Tabin & Flannery

(57) ABSTRACT

A barrier movement operator with a backup source of DC power is disclosed. The power supply of the barrier movement operator sends current limited DC to the backup which uses the DC to charge a battery. The battery is in circuit at all times with the barrier movement operator power supply by means of a power diode and, when an AC mains power failure occurs, DC power is sent from the battery to power the barrier movement operator.

24 Claims, 4 Drawing Sheets

U.S. PATENT DOCUMENTS

| | | | |
|---|---|---|---|
| 6,278,279 B1* | 8/2001 | Daun-Lindberg et al. | 324/427 |
| 6,311,279 B1* | 10/2001 | Nguyen | 713/300 |
| 6,329,796 B1* | 12/2001 | Popescu | 320/134 |
| 6,597,138 B2 | 7/2003 | Fitzgibbon | |
| 6,642,632 B2* | 11/2003 | Lucas et al. | 307/64 |
| 6,670,725 B2* | 12/2003 | Fitzgibbon et al. | 307/66 |
| 6,803,678 B2* | 10/2004 | Gottlieb et al. | 307/66 |
| 6,923,676 B2* | 8/2005 | Perry | 439/500 |
| 7,391,184 B2* | 6/2008 | Luo et al. | 320/137 |
| 2002/0195996 A1* | 12/2002 | Nakatsuji | 320/127 |
| 2003/0063715 A1* | 4/2003 | Peplinski | 379/67.1 |
| 2003/0090157 A1 | 5/2003 | Fitzgibbon et al. | |

FOREIGN PATENT DOCUMENTS

| | | |
|---|---|---|
| FR | 2 692 418 A1 | 12/1993 |
| GB | 2 241 394 A | 8/1991 |
| GB | 2 332 105 | 6/1999 |

OTHER PUBLICATIONS

Examination Report Under Section 18(3) from British Application No. GB0420187.7 Dated Jan. 18, 2006.

* cited by examiner

DC POWER BACKUP

FIELD OF THE INVENTION

The present invention relates to barrier movement systems and particularly to battery backup arrangements for such systems.

BACKGROUND OF THE INVENTION

Barrier movement systems, such as that disclosed in U.S. Pat. No. 6,597,138, generally are connected to mains voltage such as the 110V 60 HZ AC supplied by the local power company and use the power received to move a barrier under the command of a user. Such barrier movement systems include a power supply which converts the mains AC into DC to power electronic control circuitry and, when a DC motor is used to move the barrier, to power the DC motor. When mains power fails, such arrangements are unusable because they lack a source of stored power.

Known systems do exist which have a separate backup battery charging system which is connected to mains AC voltage and charge a battery when mains power is present. When mains AC power fails, the DC from the battery is switched to the barrier movement operator and used power barrier movement and to power the control circuitry for the barrier movement operator.

Such known arrangements require two inputs for mains AC power and two separate arrangements for converting the mains AC voltage to DC. As a result they are not integrated with the barrier movement operator they are large in size and relatively expensive. Further, they generally result in a significant time gap between failure of the mains power and the application of the backup supply which may result in an uncertain and unsafe movement of the barrier. The arrangement disclosed and claimed herein provides backup power for a barrier movement system utilizing, in part, the AC/DC conversion capability of the barrier movement system and which is connected to the power supply in a manner to provide rapid and efficient backup power.

DESCRIPTION

Figure 1:
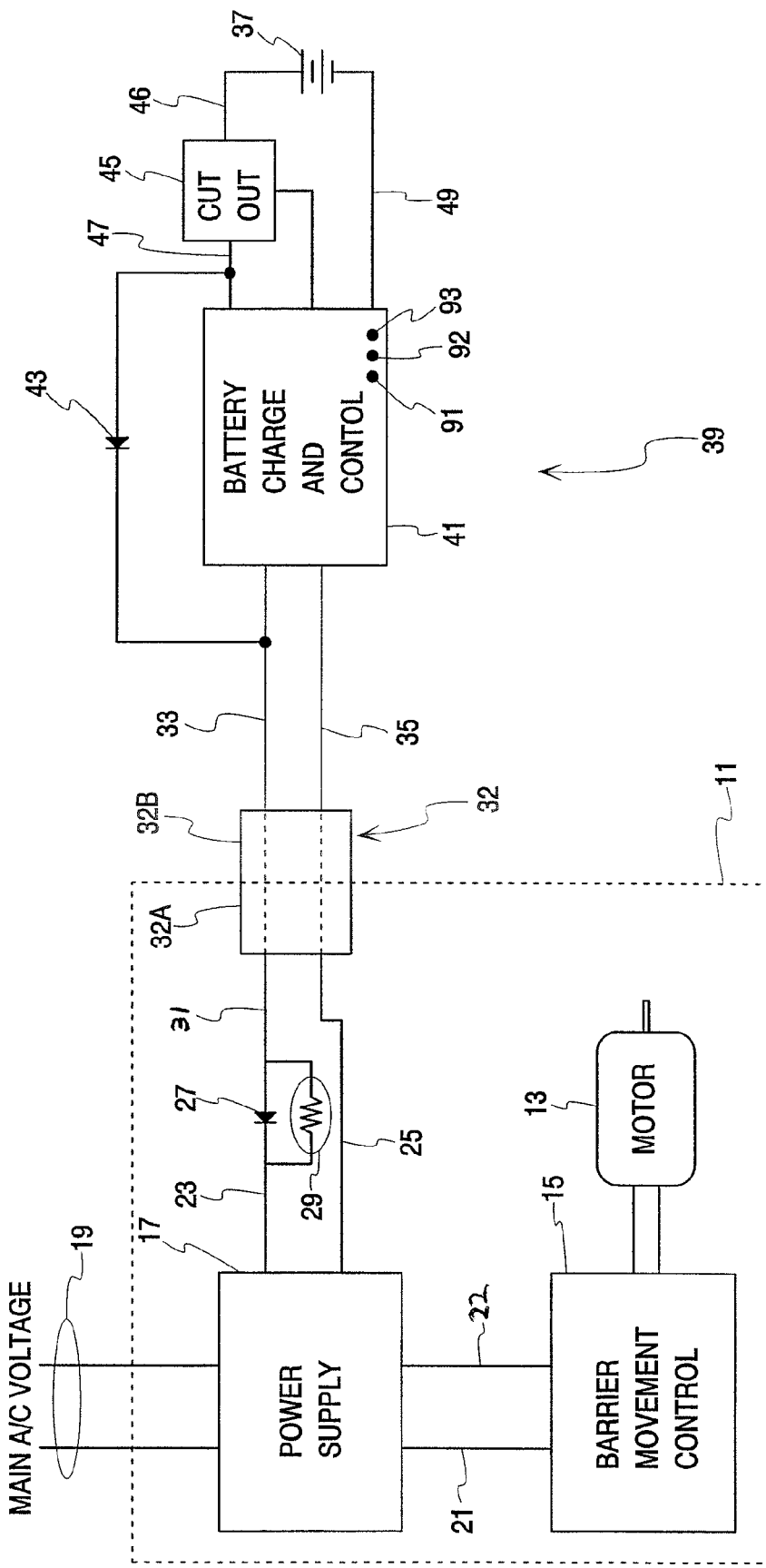
FIG. 1 is a block diagram of a barrier movement operator and battery backup arrangement.

FIG. 1 shows a barrier movement operator 11 for controlling a motor 13 and thereby move a barrier (not shown). Barrier movement operators which control the position of a barrier are well known and not described in detail herein. The barrier movement operator 11 comprises a barrier movement controller 15 which responds to operational input signals and user generated input signals to control motor 13. A power supply 17 received mains voltage at 110 V AC 60 HZ at input terminals 19 and converts a portion of the received voltage to DC. The barrier movement controller 15 is connected to receive DC voltage from power supply 17 via a conduction path 21 and is connected to power supply 17 via a communication path 22 so that the power supply can be monitored and controlled as needed.

When mains voltage is present at input terminals 19 a DC voltage is applied by power supply 17 between a conductor 23 and a conductor 25. In the present embodiment the voltage on conductor 23 is positive with respect to conductor 25 by approximately 28V. It will be apparent that other voltage levels and polarities will also provide operational systems. The DC voltage between conductors 23 and 25 may be filtered or it may be an unfiltered full wave rectified sine wave or some DC representation inbetween.

Conductor 23 is connected to the cathode of a diode 27 and to a first terminal of a PTC resistor 29. Advantageously, resistor 29 is a highly non-linear PTC device which is sometimes referred to as a self-setting fuse or a poly fuse. In the present embodiment the resistor 29 is intended to limit current from power supply 17 to conductor 31 to about 600 ma. The anode of diode 27 and a second terminal of resistor 29 are connected by a conductor 31 to one terminal of a two terminal plug 32. The other terminal of plug 32 is connected to conductor 25 from power supply 17.

Plug 32 consists of mating portions 32a and 32b. Portion 32a remains with the barrier movement operator 11 and is configured to receive plug 32b from battery backup unit 39. Plug 32 connects conductor 31 to conductor 33 and also connects conductor 25 to conductor 35. Thus, when mains voltage is present at input 19 a DC voltage will be present between conductors 33 and 35 from power supply 17. Battery backup 39 includes a nominally 24 volt battery 37 which is charged and maintained in a charged state by a battery charge and control circuit 41 and conductors 47 and 49. Conductor 47 is connected to the positive terminal of battery 37 via a cut out circuit 45 which, for purposes of the present description, can be considered to be a continuous conductor from conductor 47 to battery 37. The details of cut out circuit 45 and its functions are discussed later herein with regard to FIG. 2. Also included in battery backup 39 is a diode 43 providing unidirectional isolation between the positive terminal of battery 37 and conductor 33. Diode 43 permits current flow from battery 37 toward conductor 33 and opposes such flow in the reverse direction.

During normal operation, while mains voltage is present at input 19, a DC voltage is applied by resistor 29 to conductor 33 and is used to charge battery 37. Battery charge and control arrangement 41 regulates the amount of current drawn from power supply 17 for this purpose. Should too much current be drawn by battery backup 39 (or by low resistance between conductors 25 and 31) PTC resistor begins to heat, causing its resistance to rise to limit the outflow of current. In an embodiment, resistor 29 may limit outgoing current to 600 ma or less due to it's highly non-linear nature. If the mains voltage at input 19 fails, the DC voltage from power supply 17 will drop and the voltage between conductors will approach the 24 volts of battery 37. When this happens, battery 37 will act to keep 24V on conductor 33 via positively biased diode 43 and also on conductor 23 via positively biased diode 27. Thus, battery 37 will keep significant D.C. voltage in power supply 17 when it is used to power the barrier movement operator.

Figure 2A:
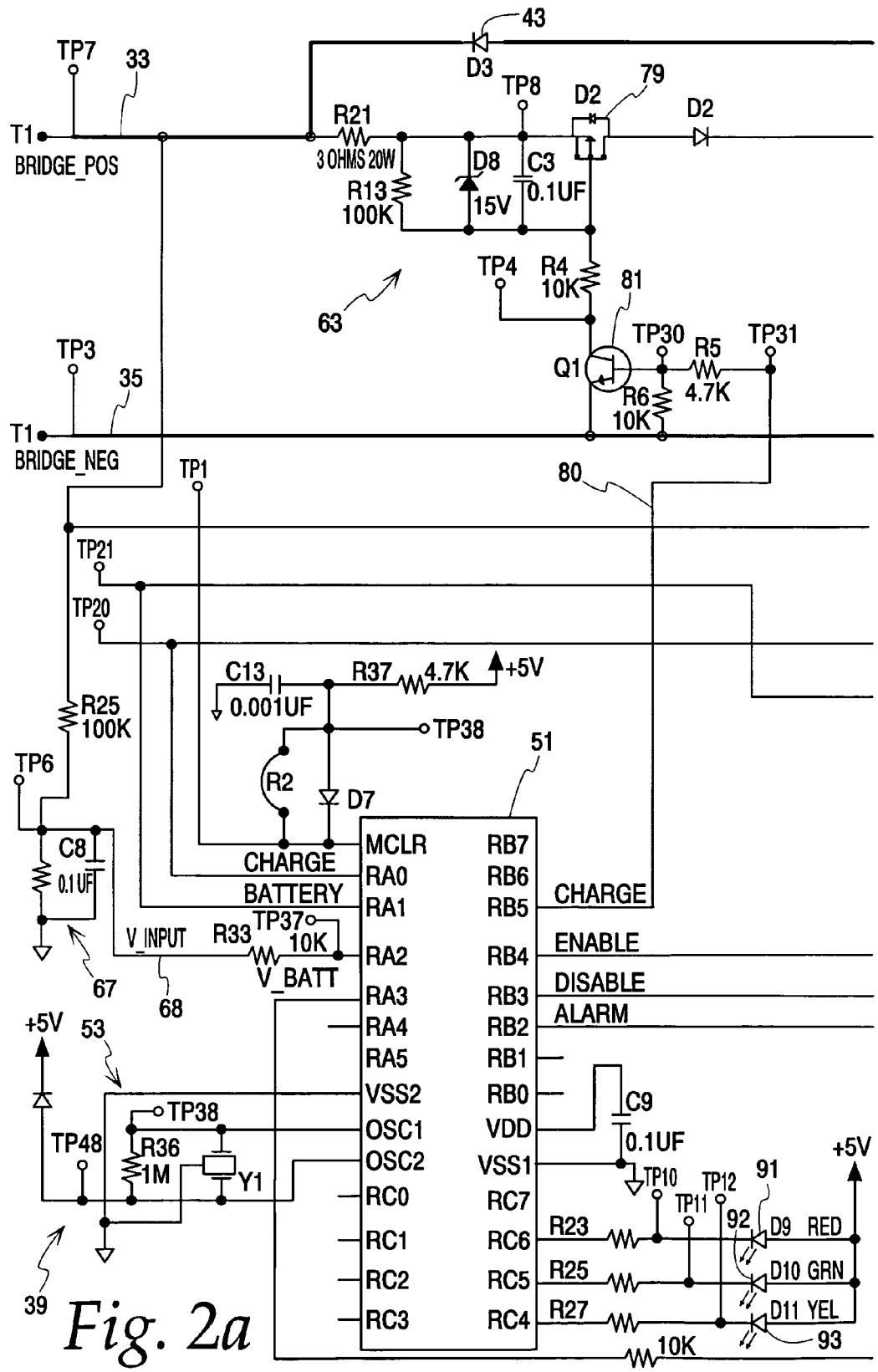
FIG. 2 is a schematic diagram of the battery backup arrangement.
Figure 2B:
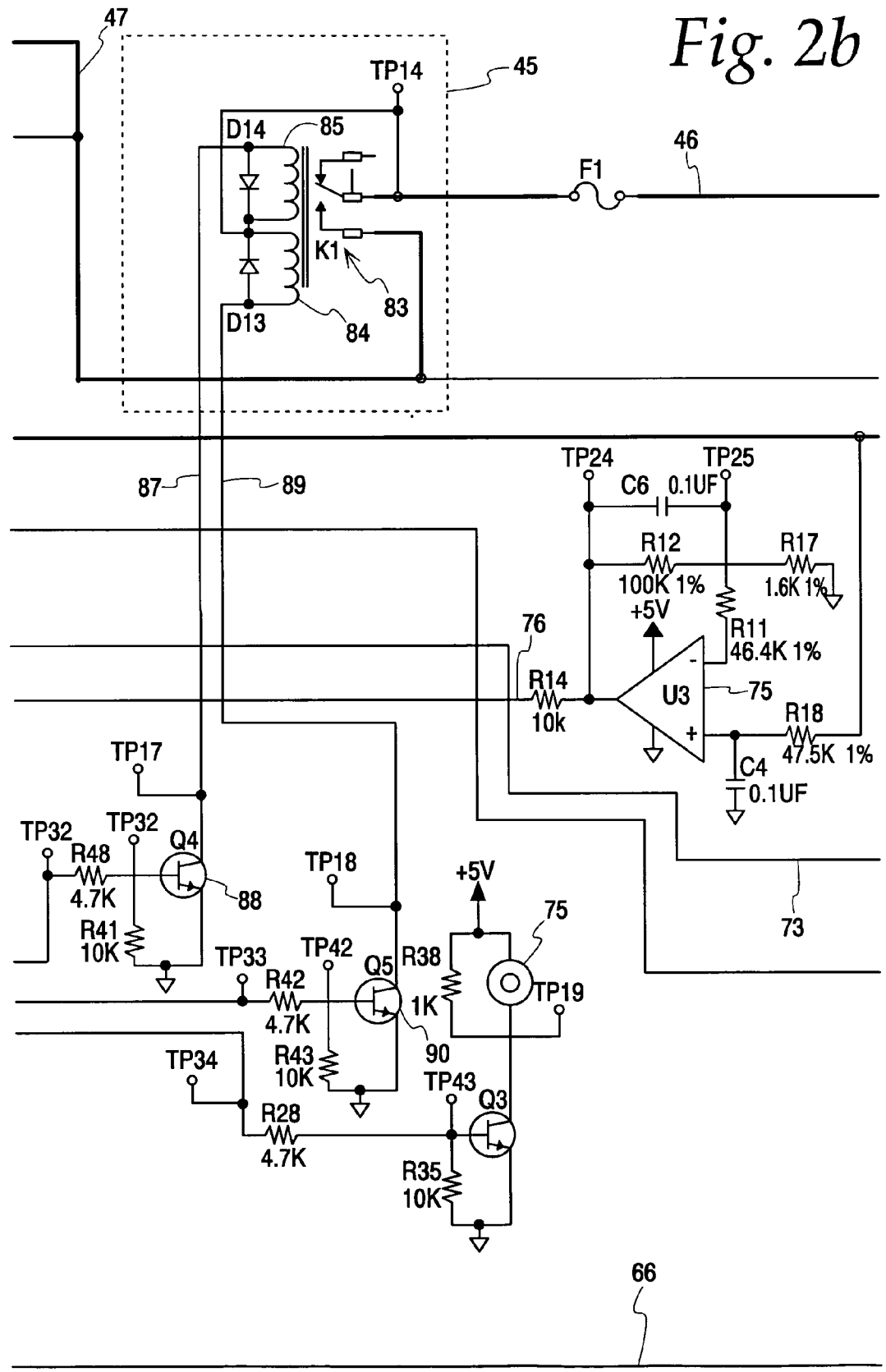
Figure 2C:
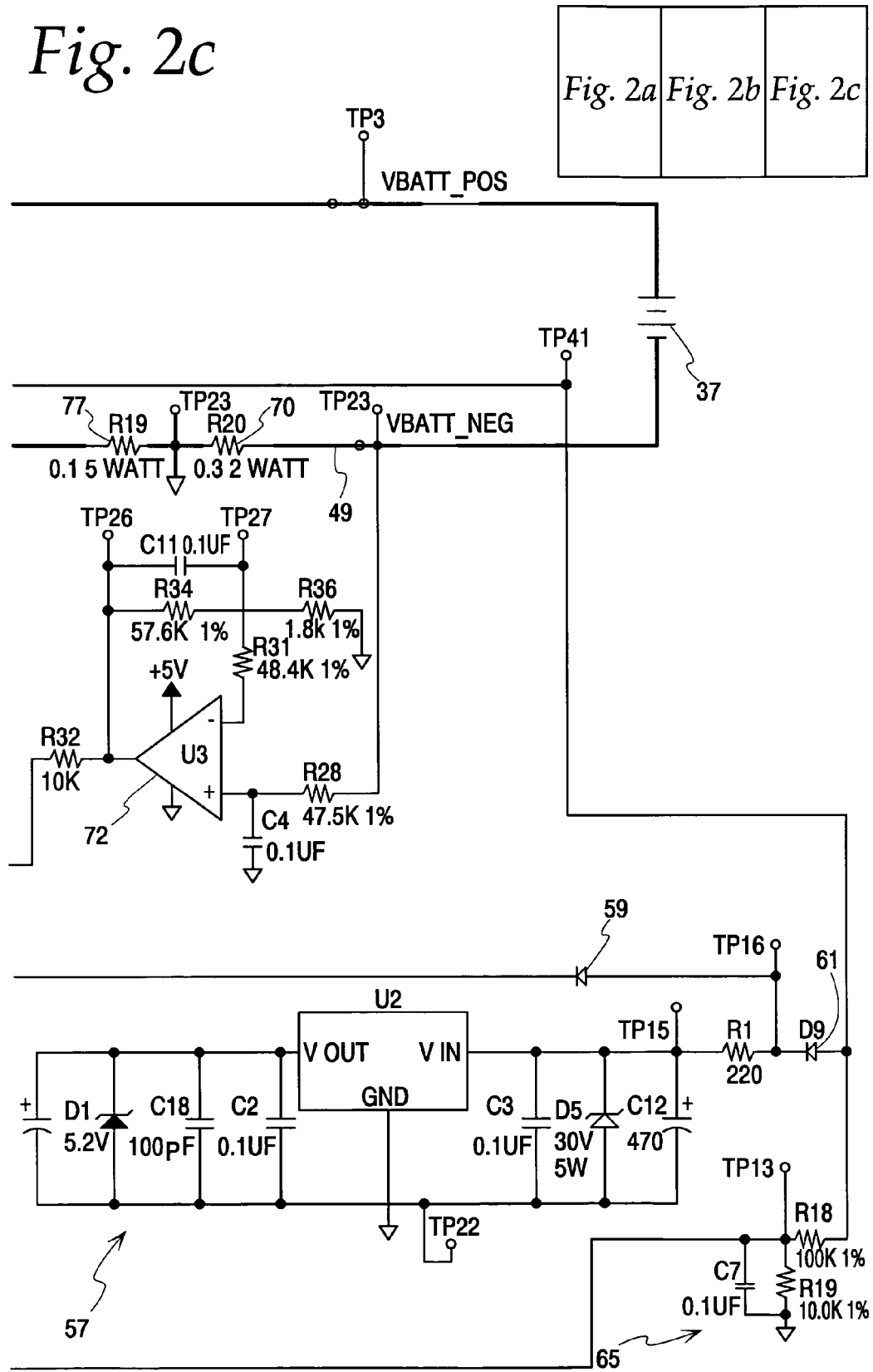

FIG. 2 is a schematic diagram of the battery charger and control 41 and includes the cut out circuit 45 and bypass diode 43. The battery 37, which is the present embodiment is a rechargeable 24V battery, is connected with its positive terminal to conductor 46 and its negative terminal to conductor 49. Control is exercised over battery charger and control 41 by a programmed microprocessor which may, for example, be a microchip PIC16F72 running at 4M HZ. Details of the oscillator circuit 53 to achieve this rate of operation are well known. Microprocessor 51 receives sensed voltage and current levels within the battery charger and control 41 and based on the sensed readings, performs functions to maintain proper operation.

Regulated power to control the operation of battery charger 41 is provided by a power supply circuit 57 in response to input power from conductor 33 and conductor 47 via diodes 59 and 61 respectively. The dual connection of input power to the power supply 57 permits selective powering of the battery charger and control 41. The voltage on conductor 47 which may be from the battery charging circuit 63 or from the battery 37 or both is sensed by a voltage divider network 65 and applied to microprocessor 51 via a conductor 66. The voltage input on conductor 33 is similarly sensed by a voltage divider 67 and applied to microprocessor 51 via a conductor 68. The charge current being provided to battery 37 is sensed from the voltage developed by a resistor 70 which voltage is applied to microprocessor 51 via an op-amp 72 and a conductor 73. Similarly the current being drawn from battery 37 is detected as a voltage across a resistor 77 which voltage is applied to microprocessor 51 via an op-amp 75 and conductor 76. Microprocessor 51 receives the signals representing various sensed parameters at analog inputs and controls operation in accordance with programming.

Battery charger 63 includes a series connected power FET 79 the conduction state of which is controlled by microprocessor 51 via a conductor 80 and driver transistor 81. The FET 79 is controlled in the pulse width modulation (PWM) mode. Control pulses are sent from microprocessor 51 at a predetermined rate e.g., 1 KHZ and the width of the control pulses is increased or decreased depending on the charging needs of battery 37. Cut out circuit 45 comprises a relay 83 which is controlled by microprocessor 51 to connect or disconnect battery 37 from the battery charging and control circuit 41. In the described embodiment, relay 83 comprises two coils 84 and 85 which are selectively enabled by microprocessor 51 to connect or disconnect the battery. The relay 83 shown must be actively pulsed to switch from one state to the other so that, should power be lost the relay will remain in the last state it was commanded to be in. The battery 37 is connected by relay 83 in response to a pulse on conductor 87 via transistor 88 and it is disconnected by a pulse on conductor 89 via a transistor 90. A user is advised as to the state of charging and control circuit 41 by three separately controlled LEDs 91, 92 and 93 which display the colors red, green and yellow respectively and by an audible signaling device 95 which in the present example is a buzzer.

When plug 32b (FIG. 1) is plugged into plug 32a and power is being provided between conductor 33 and 35 from power supply 17, the battery charge and control circuit 41 will enter, or remain in, the battery charge mode. In the battery charge mode, the battery voltage and battery charging current are sensed and a selected PWM signal is sent to FET 79 to properly charge the battery 37. While the battery is being charged the green LED 92 is flashed. When the sensed battery voltage achieves a predetermined level, microprocessor 51 reduces the PWM signal to a maintenance amount and green LED 92 is controlled to provide an apparently continuous on light. As is apparent, the relay 83 is in the closed state during battery charging and maintenance. Should the microprocessor 51 detect a faulty battery by excessive charging current or battery voltage above a predetermined threshold, the battery will be removed from the circuit by controlling cut out 45 to open circuit.

When the charging and control 39 is in the charging or maintenance state and mains power fails eliminating the ability of power supply 17 to produce DC power, current will begin to flow from battery 37 via diode 43 and conductor 33 back to the barrier movement operator 11. This transition is automatic and done without the need for control by microprocessor 51. The yellow LED 93 is enabled when power is being taken from battery 37 as will be manifested by a lower voltage at conductor 33 than at conductor 47. Should mains power be restored to barrier movement operator 11 the voltage on conductor 33 will rise and microprocessor 51 will turn off yellow LED 93 and again enter the charge mode.

When mains power remains off and the barrier movement operator 11 is moving the barrier, the increase in battery current will be sensed and buzzer 95 will be turned on to audibly advise the user that battery power is controlling present operation. Alternatively, the buzzer may be intermittently enabled during the entire time that the system is under battery power, but such is often determined to be a nuisance. While running on battery power the battery voltage is compared to a Voltage Dropping threshold and should battery voltage drop below it, the yellow LED 93 will be flashed and optionally the buzzer 95 will be enabled. Lastly, should battery voltage diminish to a Low Battery threshold, cut out 45 will be opened to protect the batteries from over discharge. The resumption of mains power will automatically restore the described arrangement to the charging state.

Several user protection mechanisms are built into the operation of the system. For example, should plug portions 32a and 32b be separated and conductors 31 and 25 be shorted, current will be limited to a small value by non-linear resistor 29. Also when unplugging occurs, no charging or discharging current will be detected by microprocessor 51. When this occurs, relay 83 is opened so that no battery power is available between conductors 33 and 35 so that improper connection of conductors 33 and 35 will be harmless.

The invention claimed is:

1. A battery backup apparatus connected with a movable barrier operator which includes a DC power supply, the battery backup apparatus comprising:
   a battery;
   a battery charging circuit coupled to the battery; and
   a conduction path between the battery and the movable barrier operator, the conduction path including a unidirectional isolation device,
   the battery backup apparatus configured to connect to a plug of the movable barrier operator, and the battery charging circuit configured to receive a DC voltage from the DC power supply located within the movable barrier operator through the plug and an impedance element in parallel with a second unidirectional isolation device disposed in the movable barrier operator to charge the battery when the DC voltage from the DC voltage supply exceeds a predetermined voltage,
   the battery backup apparatus further configured to provide a battery backup voltage through the second unidirectional isolation device, the plug, and the unidirectional isolation device, the battery backup voltage being provided from the battery when mains voltage to the movable barrier operator fails.

2. The combination of claim 1 wherein the battery backup apparatus includes an audible signaling device.

3. The combination of claim 2 wherein the battery backup apparatus includes an apparatus for enabling the audible signaling device in response to current flowing from the battery to the DC voltage supply of the movable barrier operator via the unidirectional isolation device.

4. The combination of claim 1 wherein the battery backup apparatus includes one or more visual signaling devices.

5. The combination of claim 1 wherein the battery backup apparatus comprises circuitry for limiting a current applied to a battery terminal of the battery.

6. The combination of claim 5 wherein the circuitry for limiting is configured to limit the current to an amount less than a predetermined maximum amount.

7. The combination of claim 1 wherein the battery backup apparatus includes cut out circuitry for disconnecting a battery terminal of the battery in response to determining a battery fault.

8. The combination of claim 1 wherein the impedance element comprises at least one resistor, the unidirectional isolation device comprises a diode, and the second unidirectional isolation device comprises a diode.

9. A battery backup apparatus in combination with a movable barrier operator, the combination comprising:
   a movable barrier operator, the movable barrier operator comprising:
      a DC voltage supply having a mains input voltage, the mains input voltage receiving a mains voltage;
      a barrier movement control coupled to the DC voltage supply via a DC power connection;
      an operator conductive path connected between the DC voltage supply and a plug, the conductive path including an operator unidirectional isolation device in parallel with an impedance element;
      the plug coupled to the conductive path, the plug externally accessible from the movable barrier operator;
   a battery backup apparatus comprising:
      a battery having first and second terminals;
      a battery unidirectional isolation device operatively coupled between the battery and a battery conducting path configured to electrically connect to the plug; and
      a battery charging circuit configured to receive a DC voltage from the DC voltage supply via the plug,
      wherein the battery charging circuit is configured to charge the battery when the DC voltage from the DC voltage supply exceeds a predetermined voltage,
      wherein the battery is connected to provide a battery DC voltage from the first battery terminal to the DC voltage supply via the battery unidirectional isolation device, the plug, and the operator unidirectional isolation device such that a magnitude of the battery DC voltage is conducted along the operator conduction path without being substantially adjusted by any other intervening electrical device along the operator conduction path when mains voltage to the mains voltage input fails.

10. The combination of claim 9 wherein the battery backup apparatus includes an audible signaling device.

11. The combination of claim 10 wherein the battery backup apparatus includes an apparatus for enabling the audible signaling device in response to current flowing from the battery to the DC voltage supply of the movable barrier operator via the battery unidirectional isolation device.

12. The combination of claim 9 wherein the battery backup apparatus includes one or more visual signaling devices.

13. The combination of claim 9 wherein the battery backup apparatus comprises circuitry for limiting a current applied to a battery terminal of the battery.

14. The combination of claim 13 wherein the circuitry for limiting is configured to limit the current to an amount less than a predetermined maximum amount.

15. The combination of claim 9 wherein the battery backup apparatus includes cut out circuitry for disconnecting a battery terminal of the battery in response to determining a battery fault.

16. The combination of claim 9 wherein the impedance element comprises at least one resistor, the operator unidirectional isolation device comprises a diode, and the battery unidirectional isolation device comprises a diode.

17. A battery backup apparatus in combination with a movable barrier operator, the combination comprising:
   a movable barrier operator, the movable barrier operator comprising:
      a DC voltage supply having a mains input voltage, the mains input voltage receiving a mains voltage;
      a barrier movement control coupled to the DC voltage supply via a DC power connection;
      an operator conductive path connected between the DC voltage supply and a plug, the conductive path including an operator unidirectional isolation device connected in parallel with an impedance element;
      the plug coupled to the conductive path, the plug externally accessible from the movable barrier operator;
   a battery backup apparatus comprising:
      a battery having first and second terminals;
      a battery unidirectional isolation device operatively coupled between the battery and a battery conducting path configured to electrically connect to the plug;
      a battery charging circuit configured to receive a DC voltage from the DC voltage supply via the plug,
      wherein the battery charging circuit is configured to charge the battery when the DC voltage from the DC voltage supply exceeds a predetermined voltage,
      wherein the battery is connected to provide a battery DC voltage from the first battery terminal to the DC voltage supply via the battery unidirectional isolation device, the plug, and the operator unidirectional isolation device when mains voltage to the mains voltage input fails.

18. The combination of claim 17 wherein the battery backup apparatus includes an audible signaling device.

19. The combination of claim 18 wherein the battery backup apparatus includes an apparatus for enabling the audible signaling device in response to current flowing from the battery to the DC voltage supply of the movable barrier operator via the battery unidirectional isolation device.

20. The combination of claim 17 wherein the battery backup apparatus includes one or more visual signaling devices.

21. The combination of claim 17 wherein the battery backup apparatus comprises circuitry for limiting a current applied to a battery terminal of the battery.

22. The combination of claim 21 wherein the circuitry for limiting is configured to limit the current to an amount less than a predetermined maximum amount.

23. The combination of claim 17 wherein the battery backup apparatus includes cut out circuitry for disconnecting a battery terminal of the battery in response to determining a battery fault.

24. The combination of claim 17 wherein the impedance element comprises at least one resistor, the operator unidirectional isolation device comprises a diode, and the battery unidirectional isolation device comprises a diode.

* * * * *